M. L. McCORMICK.
SULKY.
APPLICATION FILED MAY 5, 1911.
1,052,497.
Patented Feb. 11, 1913.
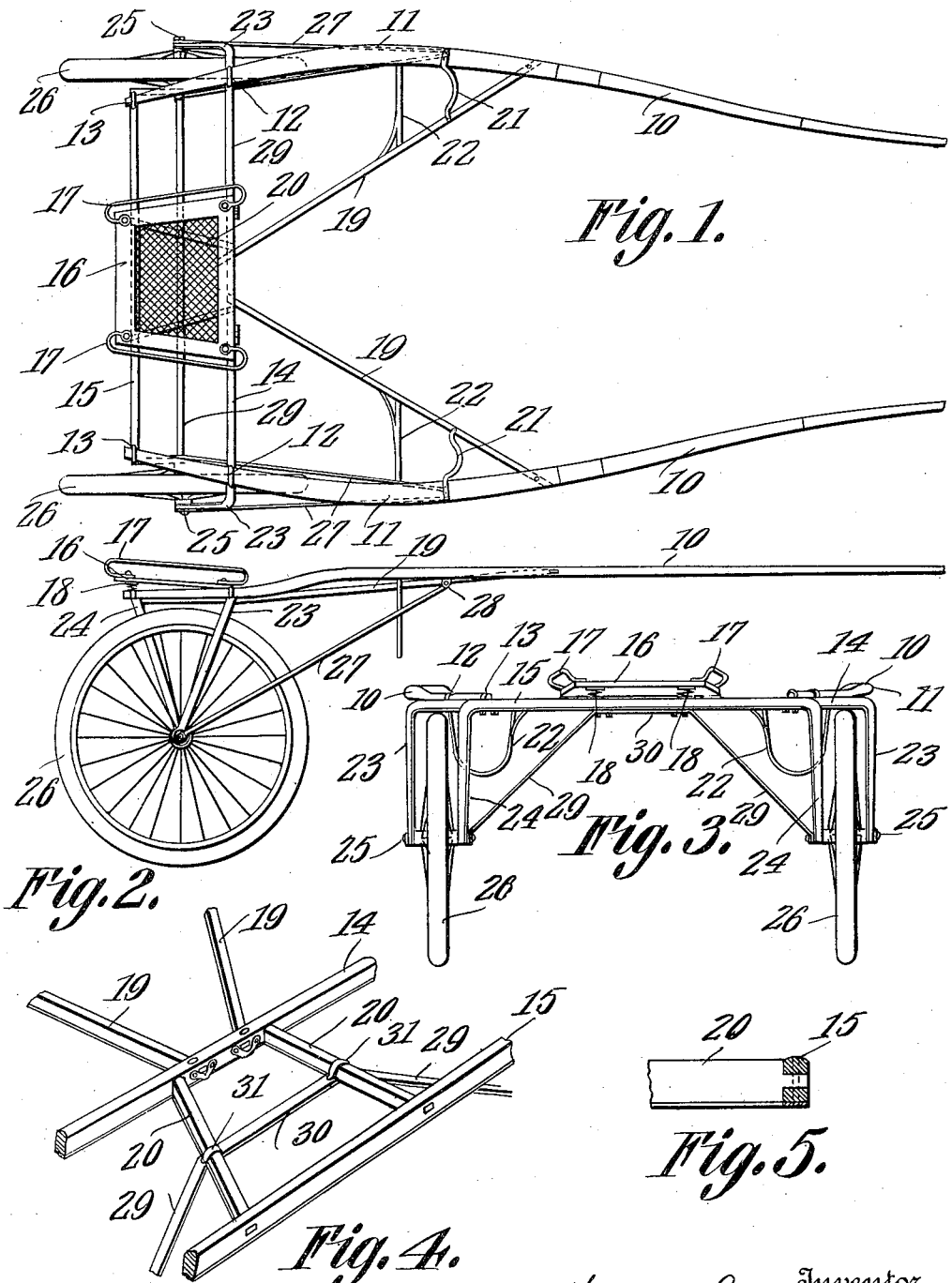

UNITED STATES PATENT OFFICE.

MARTIN L. McCORMICK, OF BALTIMORE, MARYLAND.

SULKY.

1,052,497.  Specification of Letters Patent.  Patented Feb. 11, 1913.

Application filed May 5, 1911.  Serial No. 625,199.

*To all whom it may concern:*

Be it known that I, MARTIN L. McCORMICK, a citizen of the United States, residing at Baltimore city, State of Maryland, have invented certain new and useful Improvements in Sulkies, of which the following is a specification.

This invention relates to vehicles to be drawn by horses and particularly to that class of vehicles known as sulkies or carts especially designed for racing purposes, but obviously capable of use for driving or other ordinary purposes.

The object of the invention is to provide a vehicle of this class which will be strong, simple and economical in structure and effective and durable in operation.

With this general object, and special objects which will appear hereinafter, in view, the invention consists in a sulky or cart of the class specified, comprising the improved construction, arrangement and combination of parts which will be hereinafter fully described and afterward specifically claimed.

I have illustrated a preferred embodiment of the invention in the accompanying drawing, in which—

Figure 1 represents a view in plan of a cart or sulky constructed in accordance with my invention. Fig. 2, represents a view of the same in side elevation. Fig. 3, represents a view of the same in rear elevation. Fig. 4, represents a perspective view in detail of part of the gear or frame, and Fig. 5, represents a sectional view on a plane cutting through one of the joints of the cross bars and their braces.

Like reference characters mark the same parts in all of the figures of the drawing.

Referring specifically to the drawing, 10, 10 indicate the shafts which are preferably made of wood suitably strengthened with metal and are bowed outward at 11, the rear ends passing through and secured by clips 12, 13, located respectively on the tops of cross bars 14, and 15, which form part of the frame and upon which is mounted a suitable seat 16 provided with side rails 17, the seat being pivotally hinged at its front edge to the bar, 14, of the frame and resting at its rear edge on springs 18, mounted on the bar 15.

The shafts are stiffened and steadied by means of braces 19 which connect them at about their mid-length with the cross bar 14 at about its mid-length, by means of suitable clips, and the frame is further steadied and stiffened by braces 20, which connect the cross bars 14 and 15.

Two sets of stirrups are provided, being a pair 21, 21, which connect and brace the shafts and the braces 19 at a height to accommodate the feet of the driver when racing, and a pair 22, 22, which depend lower and are connected with the same shafts and braces to accommodate the driver's feet when doing ordinary driving.

The cross bar 14, has downwardly and backwardly inclined ends 23, 23, and the cross bar 15 has downwardly and forwardly inclined ends 24, 24, said ends 23 and 24 being joined at their lower ends by axles 25 upon which, between said ends 23 and 24 are mounted wheels 26 of any preferred construction, pneumatic tired wheels being here shown.

The axles 25 are braced against backward yielding by brace rods 27 connecting them with the shafts, said brace rods in this instance being shown as connected to the shafts pivotally through the medium of clips 28, and passing downward and backward to the outer ends of the axles.

A pair of brace rods 29 connect the inner ends of the axles with the frame, being shown in this instance as formed of a single bar, the central portion 30 of which is connected to the braces 20 by clips 31 and thus serves to further strengthen and stiffen the frame.

When the shafts are forced toward each other by tightening the girth on the horse, the strain is absorbed by the braces 19 to a very large extent and by the cross bars 14 and 15 by reason of the braces 20 connecting these cross bars, the frame being by such bracing, made very rigid.

The shafts are bowed to such an extent that the wheels are below and in the rear of the bowed portion, and are thereby protected in racing inasmuch as any space which will permit the horse to pass will be wide enough to insure the wheels passing through without danger of striking any objects on the side.

The whole structure is steadied and braced in every direction, and thus protected against dislocation of parts or breakage, and while I have described the construction somewhat specifically, it will be obvious that changes in the construction and arrangement of the parts may be made without departing from the spirit and scope of the invention.

Having thus fully described my invention, what I claim as new and desire to secure by Letters Patent of the United States, is:

A vehicle of the character described, comprising a pair of wheels having axles extended on both sides thereof, a pair of parallel cross-bars, spaced apart, lying in the same horizontal plane, and provided with downturned ends, said ends of one cross-bar inclining toward the ends of the other cross-bar and the respective ends of each cross-bar engaging the inner and outer ends of said axles, braces between said cross-bars and connecting the same, a bar connecting said braces intermediate their length and turned downwardly and outwardly and supported by the inner ends of said axles, a pair of bowed shafts having their rear ends connected directly to both of said cross-bars, braces connecting said shafts to both ends of said axles, and braces between said shafts and one of said cross-bars.

In testimony whereof I affix my signature in presence of two witnesses.

MARTIN L. McCORMICK.

Witnesses:
E. WALTON BREWINGTON,
BROWN M. ALLEN.